(12) United States Patent
Kurashige (10) Patent No.: US 9,013,641 B2
(45) Date of Patent: Apr. 21, 2015

(54) PROJECTION TYPE IMAGE DISPLAY DEVICE

(75) Inventor: Makio Kurashige, Chiba (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 14/113,086

(22) PCT Filed: Apr. 20, 2012

(86) PCT No.: PCT/JP2012/060703
§ 371 (c)(1),
(2), (4) Date: Nov. 11, 2013

(87) PCT Pub. No.: WO2012/144593
PCT Pub. Date: Oct. 26, 2012

(65) Prior Publication Data
US 2014/0092321 A1  Apr. 3, 2014

(30) Foreign Application Priority Data

Apr. 22, 2011 (JP) .................................. 2011-096310

(51) Int. Cl.
*G02F 1/1335* (2006.01)
*H04N 9/31* (2006.01)
*G02B 27/48* (2006.01)
(Continued)

(52) U.S. Cl.
CPC .............. *H04N 9/3141* (2013.01); *G02B 27/48* (2013.01); *G03B 21/006* (2013.01); *G03B 21/2033* (2013.01); *G03B 21/208* (2013.01);
(Continued)

(58) Field of Classification Search
CPC . H04N 9/3197; H04N 9/3105; H04N 5/7441; H04N 9/3108; G02F 1/1334

USPC ......................................................... 349/5, 7
See application file for complete search history.

(56) References Cited

U.S. PATENT DOCUMENTS

| 8,727,543 B2 * | 5/2014 | Kurashige et al. .............. 353/98 |
| 2003/0039036 A1 * | 2/2003 | Kruschwitz et al. .......... 359/707 |

(Continued)

FOREIGN PATENT DOCUMENTS

| JP | H06-208089 | 7/1994 |
| JP | H09-5526 | 1/1997 |
| JP | H11-271536 | 10/1999 |
| WO | WO 2006/137326 A1 | 12/2006 |

OTHER PUBLICATIONS

International Search Report for International Application No. PCT/JP2012/060703 dated Jun. 26, 2012.

*Primary Examiner* — Mike Qi
(74) *Attorney, Agent, or Firm* — Kratz, Quintos & Hanson, LLP (57) ABSTRACT

To effectively suppress speckle noise generated when coherent light is used as a light source in a projection type image display device using an LCOS Liquid Crystal On Silicon). A projection type image display device according to the present invention includes: a light source that emits coherent light; an optical scanning section that scans the coherent light emitted from the light source; an LCOS that has an image formation area in which an image is formed; a projection optical system that projects an image formed on the image formation area on a screen; and a hologram that has polarization selectivity and diffuses scanning light scanned by the optical scanning section so as to allow diffusion light emitted from respective points thereof to illuminate the image formation area in an overlapping manner.

6 Claims, 6 Drawing Sheets

(51) Int. Cl.
*G03B 21/00* (2006.01)
*G03B 21/20* (2006.01)
*G03H 1/22* (2006.01)

(52) U.S. Cl.
CPC ........... *H04N9/3102* (2013.01); *H04N 9/3161* (2013.01); *G03H 2001/2297* (2013.01)

(56) References Cited

U.S. PATENT DOCUMENTS

2014/0043591 A1* 2/2014 Kurashige et al. ............... 353/85
2014/0340651 A1* 11/2014 Kurashige et al. ............... 353/38

* cited by examiner

PROJECTION TYPE IMAGE DISPLAY DEVICE

TECHNICAL FIELD

The present invention relates to a projection type image display device that uses coherent light such as laser light to illuminate an optical modulation element to project an image on a screen and, more particularly, to a projection type image display device that uses an LCOS (Liquid Crystal On Silicon) as the optical modulation element.

BACKGROUND ART

There is known a projector (projection type image display device) that uses an optical modulation element (micro display) such as a liquid crystal or MEMS to visualize illumination light from a light source and projects an image based on the illumination light on a screen. Some of such projectors use, as its light source, a white light source such as a high-pressure mercury lamp and projects an image on a screen while magnifying an image obtained by illuminating a secondary optical modulation element such as a liquid crystal.

However, a high-intensity discharge lamp such as the high-pressure mercury lamp has a comparatively short life, so that when the high-intensity discharge lamp is used for a projector, the lamp needs to be replaced frequently with new one. Moreover, the use of the high-intensity discharge lamp disadvantageously increases a size of the projector. Moreover, it is unfavorable to use the high-pressure mercury lamp that uses mercury, in terms of environmental burden. To solve such drawbacks, a projector that uses laser light as its light source is proposed. A semiconductor laser has a longer life than the high-pressure mercury lamp and allows size reduction of the entire projector.

The laser light thus expected to be used as a next-generation light source for projector is excellent in linearity, so that it is considered that incidence rate can be enhanced more than an LED. However, in a case where the laser light is used as the light source, speckle noise may generate due to high coherence, disadvantageously making an image difficult to see.

The speckle noise is granular noise generated due to interference of scattering light from a minute irregularity of a surface to be irradiated when coherent laser light is used as a light source. The speckle noise generated in the projector not only causes degradation of image quality but also provides physiologic discomfort to a viewer. To reduce the speckle noise, various attempts, such as to vibrate a diffuser plate through which the laser light passes, to widen a wavelength spectrum of laser, and vibrate a screen itself which is an irradiation target of the laser light are made. As one of such attempts for speckle noise reduction, Patent Document 1 discloses a non-speckle display device that reduces the speckle noise by rotating a light diffusing element through which coherent light passes.

PRIOR ART DOCUMENT

Patent Document

Patent Document 1: JP06-208089A

SUMMARY OF THE INVENTION

Problem(s) to be Solved

The speckle noise reduction method disclosed in Patent Document 1 can average speckle noise (interference pattern) generated before arrival of a diffusion element. However, since an angle of incident light from a diffusion center to the screen is invariant at any point on the screen, so that light scattering characteristics at respective points on the screen are constant, with the result that removal effect of the speckle noise generated on the screen can hardly be obtained.

In recent years, an LCOS (Liquid Crystal On Silicon) that uses a reflective liquid crystal as the optical modulation element in a projector as a projection type image display device is developed. The LCOS changes a polarization direction of incident light on a liquid crystal surface and selectively outputs image light using a polarization beam splitter, to thereby form the image. Although it can be considered that such an LCOS uses, as a light source, the coherent light such as laser light, above-described various problems due to the speckle can be caused.

In a case where the LCOS and polarization beam splitter are used in combination, incident angle of light to the polarization beam splitter is subject to restraint, so that polarization selectivity is reduced in a case where a polarization beam splitter for RGB three-color lights is used, as compared to a case where a polarization beam splitter for monochromatic light is used. Moreover, it costs so much to upgrade the polarization selectivity. Moreover, use of the LCOS for each of RGB three-color lights increases the number of the polarization beam splitters to be used, or makes an optical path complicated to make positioning of LCOS panels cumbersome and complicated.

Means for Solving the Problem(s)

A projection type image display device according to an aspect of the present invention includes: a light source that emits coherent light; an optical scanning section that scans the coherent light emitted from the light source; an LCOS that has an image formation area in which an image is formed; a projection optical system that projects an image formed on the image formation area on a screen; and a hologram that has polarization selectivity and diffuses scanning light scanned by the optical scanning section so as to allow diffusion light emitted from respective points thereof to illuminate the image formation area in an overlapping manner.

In the projection type image display device according to the present invention, the optical scanning section is a mirror device.

In the projection type image display device according to the present invention, the hologram having polarization selectivity has a liquid crystal hologram that can switch between a diffraction state and a transmission state with respect to polarized light oscillated in a specific direction in response to voltage application.

In the projection type image display device according to the present invention, the light source has unit color light sources that emit coherent lights of different wavelengths from each other, the hologram is formed by stacking a plurality of the liquid crystals, and the projection type image display device includes a controller that turns on, in series, the unit color light sources to put the liquid crystal hologram corresponding to the turned-on unit color light source into the diffraction state.

In the projection type image display device according to the present invention, the hologram having polarization selectivity includes a photorefractive material having refractive index anisotropy or a liquid crystal having refractive index anisotropy.

A projection type image display device according to an another aspect of the present invention includes: a light source that emits coherent light; an optical scanning section that scans the coherent light emitted from the light source; an LCOS that has an image formation area in which an image is formed; a projection optical system that projects an image formed on the image formation area on a screen; a first hologram that diffuses scanning light scanned by the light scanning section; and a second hologram that has polarization selectivity and diffracts diffusion light from the first hologram, wherein the diffusion lights emitted from respective points of the first hologram are diffracted by the second hologram so as to illuminate the image formation area in an overlapping manner.

Advantage(s) of the Invention

According to the projection type image display device of the present invention, the optical scanning section scans the coherent light to cause the diffusion lights from respective points of the light diffusing element to illuminate the image formation area as an area to be illuminated at an angle changing with time. This changes with time the speckle generated in the area to be illuminated to make the speckle invisible to a viewer. Moreover, in the projection type image display device according to the present invention, the screen is also subjected to irradiation at an angle changing with time, thereby effectively suppressing the speckle to be generated on the screen.

MODE FOR CARRYING OUT THE INVENTION

Figure 1:
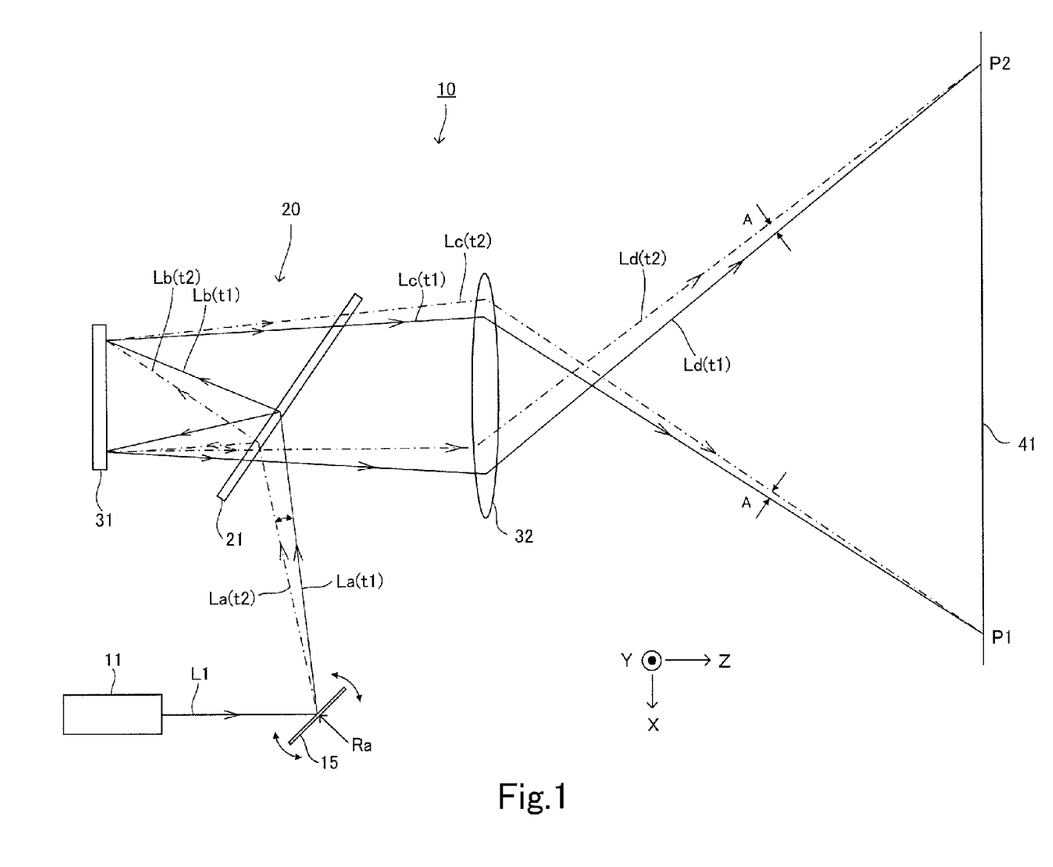
FIG. 1 is a view illustrating a configuration of a projection type image display device according to an embodiment of the present invention.

Now, a projection type image display device according to an embodiment of the present invention will be described with reference to the drawings. FIG. 1 is a view illustrating a configuration of a projection type image display device according to an embodiment of the present invention. It should be noted that drawings described hereinafter are each a schematic diagram, and may represent different shape, dimension, and position from those actual sections.

A projection type image display device 10 according to the present embodiment includes an illumination section 20, an LCOS (Liquid Crystal On Silicon) 31 for forming an image, and a projection optical system 32 that projects an image formed in an image formation area of the LCOS 31 on a screen 41. In the drawings, a surface of the screen 41 on which an image is projected is assumed to be X-Y plane, and an axis normal to the X-Y plane is assumed to be a Z-axis. As the screen 41, a reflective screen for observing an image reflected by the screen 41 or a transmissive screen for observing an image transmitted through the screen 41 can be used.

The illumination section 20 of the present embodiment includes a light source 11, an optical scanning section 15, a hologram 21, and the LCOS 31.

As the light source 11, various types of laser systems, including a semiconductor laser system, that emit laser light as coherent light can be used. In the present embodiment, the LCOS is used as the optical modulation element, so that the light source 11 that emits linearly polarized coherent light, e.g., p-polarized coherent light is used.

The optical scanning section 15 is a mirror device that can rotate a reflecting surface about a rotation center Ra. More specifically, as the optical scanning section 15, a mirror device that mechanically rotates a movable mirror such as a polygon mirror, a galvano scanner, or an MEMS scanner is used. In addition, various configurations, like an acoustic-optical effect scanner that modulates a refractive index, can be adopted.

Coherent light L1 is scanned in terms of time by the optical scanning section 15, and resultant scanning light La is diffracted by the hologram 21 having polarization selectivity to be illumination light Lb that illuminates the LCOS 31 serving as an optical modulation element. In the present embodiment, a polarization component (p-polarization component) emitted from the light source 11 is diffracted.

The LCOS 31 is a reflective liquid crustal panel having a liquid crystal layer formed on a silicon substrate. The LCOS 31 controls a pixel electrode provided on the silicon substrate to control polarization characteristics of incident light to thereby form an image in the image formation area. Light entering a turned-on pixel is reflected by the liquid crystal layer with its phase changed by 90 degrees, and light entering a turned-off pixel is reflected unchanged. Outgoing light from the turned-on pixel enters the projection optical system 32 through the hologram 21 having polarization characteristics to form a bright portion. On the other hand, outgoing light from the turned-off pixel is diffracted by the hologram 21 toward the optical scanning section 15.

The coherent light L1 emitted from the light source 11 enters the reflecting surface of the optical scanning section 15. Preferably, the coherent light is made to enter a point (hereinafter, referred to also as "reference point") on the reflecting surface which is hardly changed in position when the optical scanning section 15 is rotated. Making the coherent light enter the reference point allows reference light used in producing the hologram 21 to be focused onto the reference point of the optical scanning section 15, thereby allowing an image recorded onto the hologram 21 to be obtained reliably.

Figure 2:
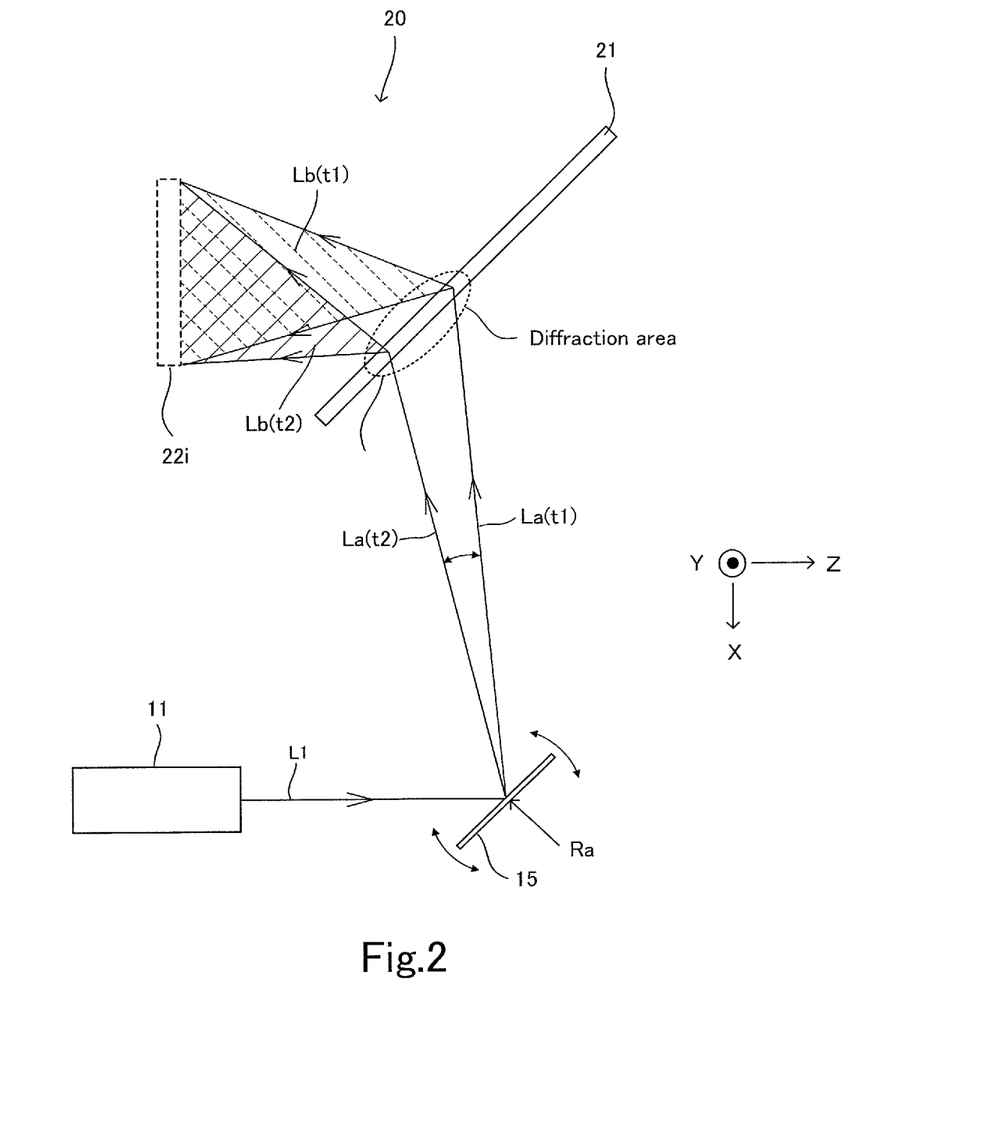
FIG. 2 is a view illustrating a configuration of an illumination section according to the embodiment of the present invention.

FIG. 2 is a view illustrating the illumination section 20 of the projection type image display device of FIG. 1. Here, a function of the hologram 21 scanned by the scanning light La from the optical scanning section 15 will be described. The hologram 21 is an optical device that receives the scanning light La to illuminate an area to be illuminated (image formation area of the LCOS 31 in the present embodiment), and a reflective hologram is used as the hologram 21 in the present embodiment. Preferably, the hologram 21 is formed using a photorefractive material having refractive index anisotropy or a liquid crystal having refractive index anisotropy.

The use of the hologram 21 allows the same reproduction image to be always obtained regardless of an incident position of the scanning light La, thereby allowing the entire image formation area (area to be illuminated) of the LCOS 31 to be illuminated uniformly. Moreover, the use of the hologram 21 makes it possible to enhance a degree of freedom of the scanning light La to be made incident on the hologram 21 in terms of a beam cross-sectional shape or an incident angle, which in turn enhances a degree of freedom of a layout of the device.

The hologram 21 used in the present embodiment reproduces a diffuser image 22i as a recorded reproduction image. The coherent light emitted from the light source 11 is reflected by the rotating optical scanning section 15 to be the scanning light La, and the scanning light La reciprocates on an incident surface of the hologram 21 for scanning. FIG. 2 illustrates scanning lights La (t1) and La (t2) at given times t1 and t2. The hologram 21 of the present embodiment forms the diffuser image 22i as a reproduction image with respect to light (reproduction illumination light) having a predetermined incident angle. The scanning light La scanned by the optical scanning section 15 is set to be the reproduction illumination light with respect to the hologram 21 at any scanning point. Production of the hologram 21 to be used in the present embodiment will be described later.

As illustrated in FIG. 2, the scanning light La (t1) at the time t1 is diffracted by the hologram 21 to be illumination light Lb (t1) as a reproduction light to form the diffuser image 22i. On the other hand, the scanning light La (t2) at the time t2 is diffracted by the hologram 21 to be illumination light Lb (t2) to form the diffuser image 22i. By scanning the scanning light La in this manner, the diffuser images 22i having the same shape are overlapped with each other at the same position regardless of which incident position of the hologram 21 is irradiated with the scanning light La. By making the diffuser image 22i include the entire area to be illuminated, it is possible to uniformly illuminate the entire area to be illuminated at any scanning point.

Figure 3:
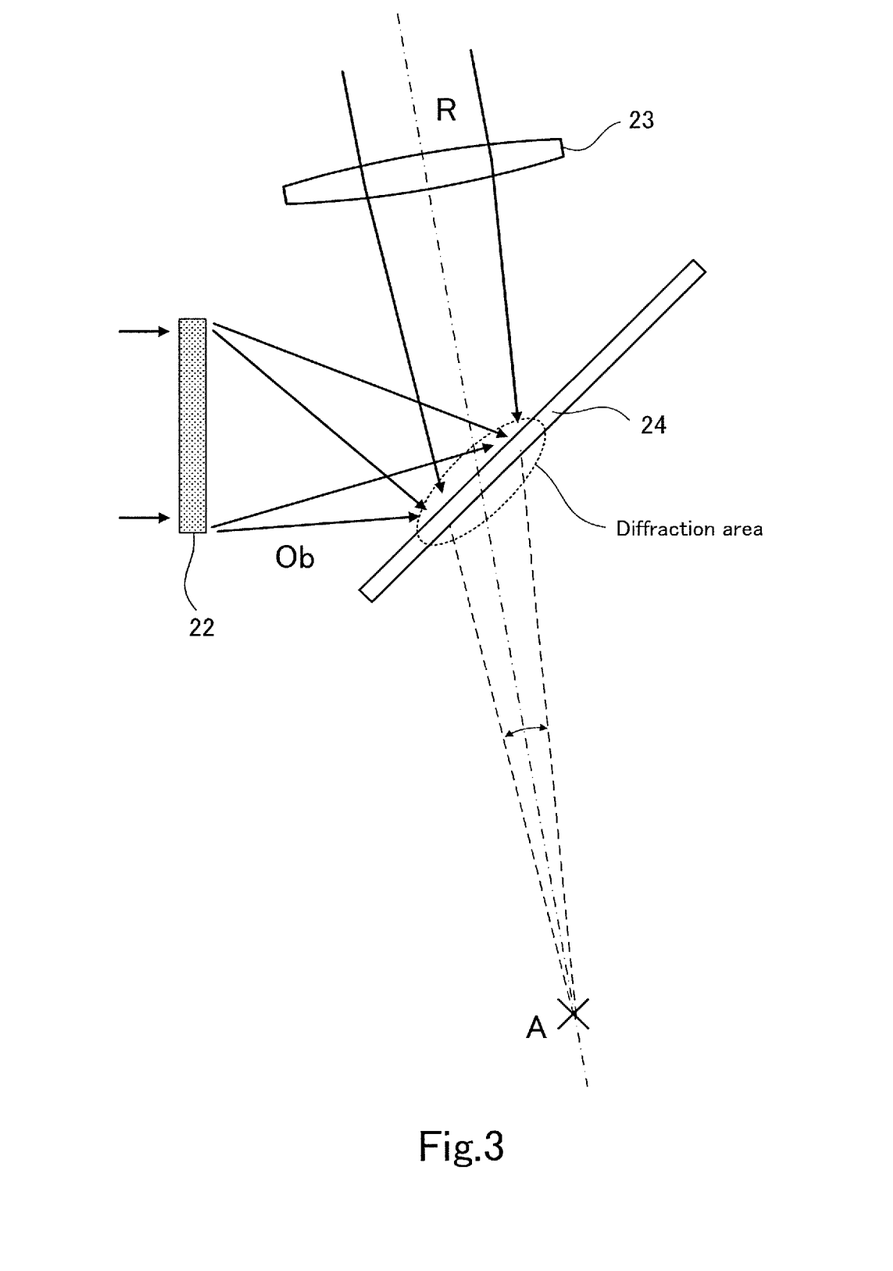
FIG. 3 is a view illustrating production of a hologram to be used in an illumination section according to the embodiment of the present invention.

FIG. 3 is a view illustrating a configuration (interference exposure) when the transmissive hologram 21 to be used in the illumination section according to the embodiment of the present invention is recorded (produced). Laser light is irradiated onto a diffuser plate 22 from its rear surface side to make object light Ob diffused forward enter one surface of a hologram recording material 24. At this time, the diffuser plate 22 diffuses the object light Ob such that diffusion light (object light) from each point on the diffuser plate 22 illuminates the entire diffraction area of the hologram recording material 24 to be used at reproduction time.

Then, reference light R collected by a light collection optical system 23 is irradiated on the same surface of the hologram recording material 24. A focal position A of the light collection optical system 23 is set so as to coincide with the reference point of the optical scanning section 15 at a time of use. The object light Ob and reference light R are made to enter the hologram recording material 24 at the same time and are made to interfere with each other therein. It should be noted that the object light Ob and reference light need to have interference characteristics with each other. Thus, for example, laser light oscillated from the same light source is divided into two beams, and one beam is used as the object light Ob, and the other is used the reference light R.

The hologram recording material 24 is then subjected to post-processing such as heating and ultraviolet ray irradiation, whereby the transmissive hologram 21 that reproduces the diffuser image at the same position on the respective points on the surface thereof. For irradiation of the object light Ob to be used in recording, there can be used not only the ordinary diffuser plate 22 such as an opal glass or a frosted glass, but also a light diffusing element, such as a lens array, that can illuminate the entire area to be used with diffusion light from each point thereon. Although the object light Ob and reference light R are made to interfere with each other to achieve recording (interference exposure) of an interference pattern in the present embodiment, so-called a computer-generated hologram obtained by recording the interference pattern calculated using a computer onto the hologram recording material 24 may be adopted.

Returning to FIG. 1, modulated light Lc modulated by the LCOS 31 is magnified by the projection optical system 32 and projected on the screen 41 as image reproduction light Ld, allowing a viewer to observe an image reflected from or transmitted through the screen 41. The projection optical system 32 is an optical system configured to produce an image on the screen 41 even when the modulated light Lc changes with time. Actually, the projection optical system 32 is constituted by a plurality of optical elements including a lens.

In general, the coherent lights projected on the screen 41 interfere with each other to cause speckle. However, in the present embodiment, the coherent light is scanned by the optical scanning section 15, which consequently sequentially changes the image reproduction light Ld to be projected on the screen 41. This makes the speckle less noticeable extremely and effectively.

For example, the image reproduction light Ld (t1) at the time t1 and image reproduction light Ld (t2) enter a point P1 on the screen illustrated in FIG. 1 at different incident angles. The same can be said for a point P2 illustrated in FIG. 1 and other not illustrated points. That is, the image reproduction light projects an image on the screen 41 while changing with time the incident angle. Therefore, in an extremely short time, the speckle formed on the screen is averaged by the image reproduction light Ld which is irradiated at an incident angle changing with time and thereby becomes sufficiently less noticeable to the viewer viewing the image projected on the screen 41.

The speckle observed by the viewer includes not only the speckle thus generated due to scattering of the coherent light on the screen 41, but also speckle generated on various optical elements of the projection type image display device 10. Such speckle is observed by the viewer when being projected on the screen 41 through the projection optical system 32. In the present embodiment, the scanning light La scans the hologram 21 to illuminate the image formation area of the LCOS 31 as the area to be illuminated. That is, illuminating the area to be illuminated so as to isolate in terms of time the diffusion lights from respective points of the hologram 21 from each other allows cancellation of phase information retained until the light passes through the hologram 21 and allows prevention of interference between the diffusion lights from respective points of the hologram 21, which can make the speckle generated on the respective optical elements of the projection type image display device 10 sufficiently less noticeable.

The projection type image display device according to the embodiment of the present invention has thus been described. The following describes embodiments of various components used in the projection type image display device. Although detailed descriptions of a scanning mode of the optical scanning section 15 are not made in the above embodiment, the optical scanning section 15 may one-dimensionally or two-dimensionally scan the hologram 21 with the coherent light L1. In each case, it is necessary for the diffusion light from each point on the hologram 21 to sufficiently illuminate the entire area to be illuminated.

Figure 4:
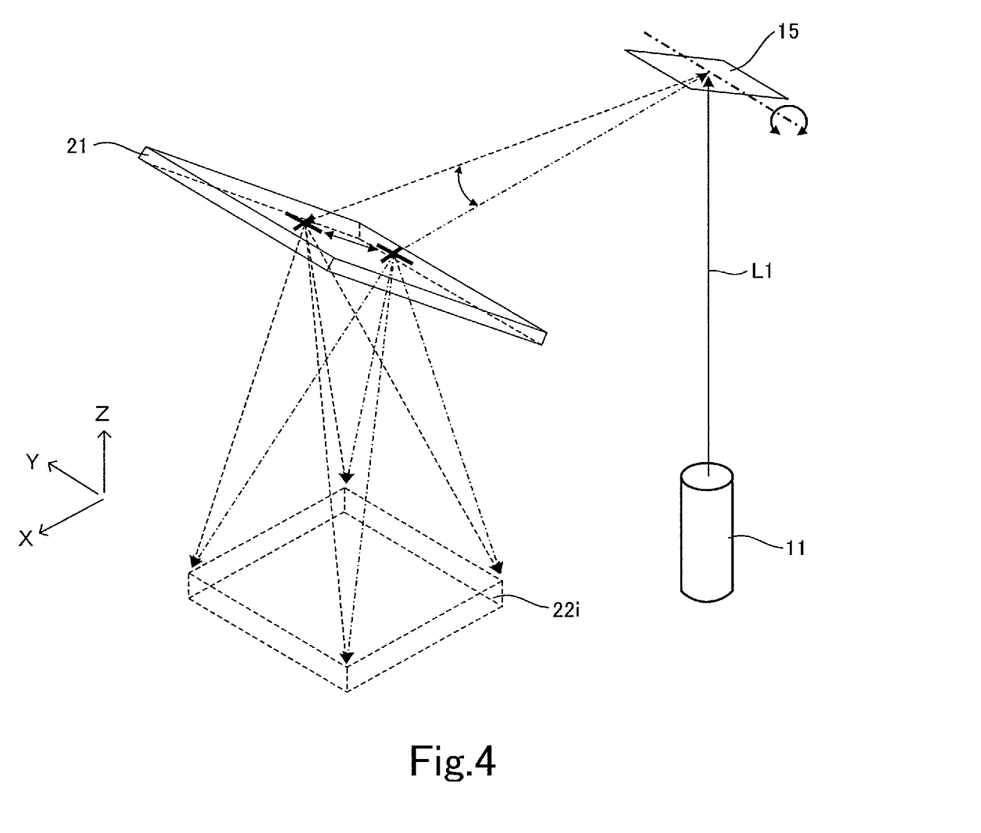
FIG. 4 illustrates a mode of optical scanning according to the embodiment of the present invention.

FIG. 4 illustrates an embodiment of the optical scanning section 15 that performs one-dimensional scanning. In this embodiment, the coherent light L1 emitted from the light source 11 is reflected on the reflecting surface of the optical scanning section 15 is resonance oscillated about one axis and linearly reciprocates on the hologram 21 for scanning. At this time, by making the reference point which has a small amount of rotation on the optical scanning section 15 coincide with the focal point A of the light collection optical system 23 used in recording time of the hologram 21, it is possible to reliably reproduce the diffuser image 22i recorded on the hologram 21.

The scanning light emitted from the optical scanning section 15 scans the hologram 21, and the hologram 21 emits the recorded diffuser image 22i. As described above, the hologram 21 is configured to form the diffuser image 22i at any scanning point. The hologram 21 scanned by the scanning light La which linearly reciprocates between X marks in the drawing always forms the same diffuser image 22i. The use of the hologram 21 thus configured can make a scanning area (diffraction area) linear, which in turn allows a small-sized hologram 21 to be used. Moreover, since the optical scanning section 15 is rotated about one axis, a drive system and a control system therefor can be simplified. The scanning mode is not limited to the one-dimensional scanning. For example, it is possible to two-dimensionally scan the hologram 21 by the optical scanning section 15 configured to be rotated about two axes.

Figure 5:
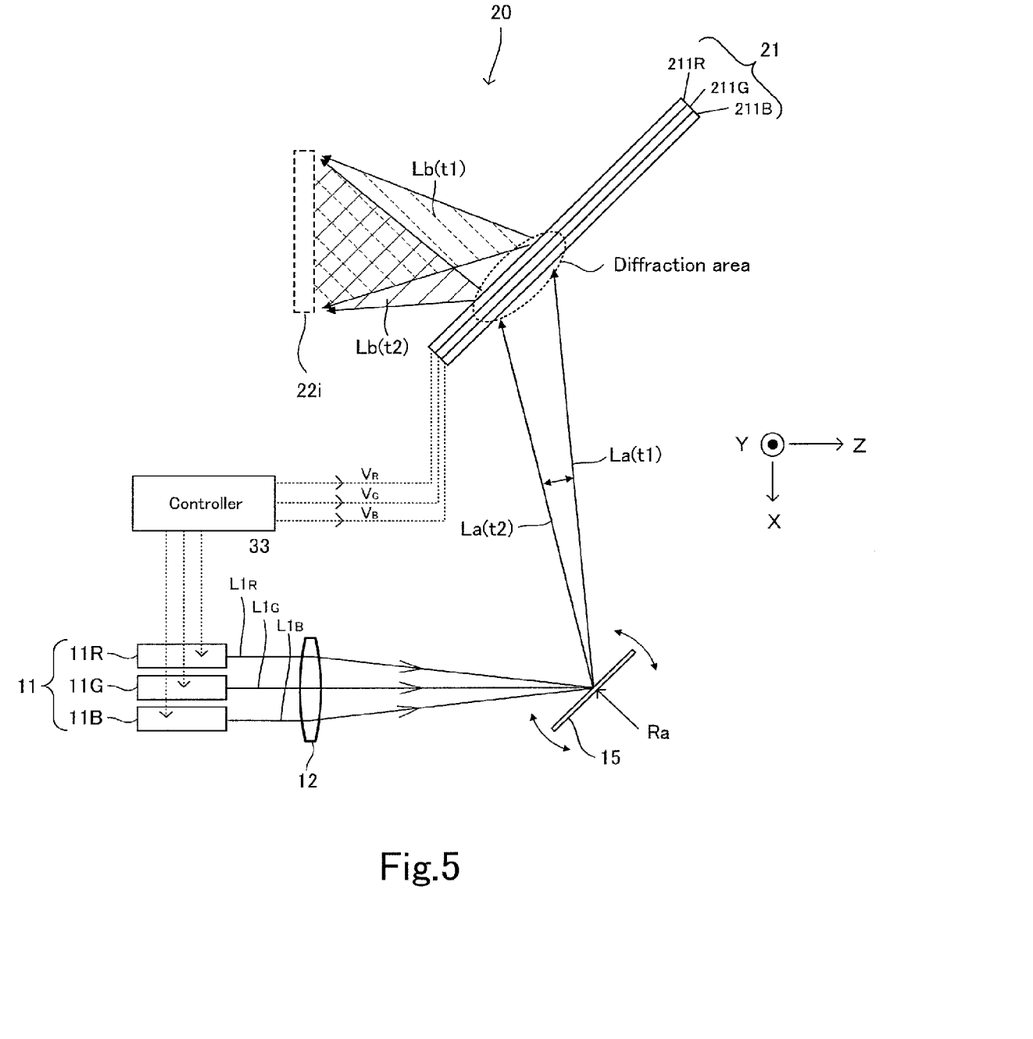
FIG. 5 is a view illustrating a configuration of the illumination section according to another embodiment of the present invention.

FIG. 5 is a view illustrating a configuration of the illumination section according to another embodiment of the present invention. In the above-described projection type image display device, an image is reproduced using a monochrome light source, while in the present embodiment, RGB unit color light sources 11R, 11G, and 11B having different wavelengths are provided and, thus, a full-color image can be reproduced.

The hologram 21 to be used in the present embodiment is formed by stacking liquid crystal holograms 211R, 211G, and 211B corresponding to the wavelengths of respective colors. Each liquid crystal hologram 211 is applied with voltage to switch between a diffraction state and a transmission state with respect to polarized light oscillated in a specific direction. To realize this, there is provided a controller 33 that controls application of voltages VR, VG and VB to respective liquid crystal holograms 211. The controller 33 controls lighting of each unit color light source 11. The controller 33 turns on, in series, the unit color light sources 11 of respective colors to put the liquid crystal hologram 211 corresponding to the turned-on unit color light source into the diffraction state and put the remaining liquid crystal holograms 211 into the transmission state, thereby achieving formation of the diffuser image 22i according to the wavelength of the coherent light emitted from the light source 11. The liquid crystal holograms 211 used in the present embodiment are each a diffraction element having polarization selectivity as in the above-described embodiment. When such liquid crystal holograms 211 are incorporated in the projection type image display device, an incident polarization component from the optical scanning section 15 is diffracted thereby, and the polarization component rotated by 90 degrees by the LCOS 31 is transmitted therethrough to be projected on the screen 41.

The LCOS 31 is subjected to synchronization control so as to form an image according to emitted coherent lights L1R, L1G, and L1B, and hologram 21 illuminates the entire image formation area of the LCOS 31 with colors according to the formed image, causing modulation lights Lc of respective wavelengths to be emitted from the LCOS 31.

In the present embodiment, the coherent lights of RGB three colors are used to reproduce a full-color image, and by using the hologram 21 as in the present embodiment, it is possible to unify the optical systems that have conventionally been provided for each wavelength, thereby allowing size reduction of the device. Moreover, a configuration may be adopted, in which the illumination section 20 and LCOS 31 described in FIG. 2 are each prepared for each wavelength, and modulated lights formed by the LCOSes 31 of respective colors are synthesized by an optical element for projection.

Figure 6:
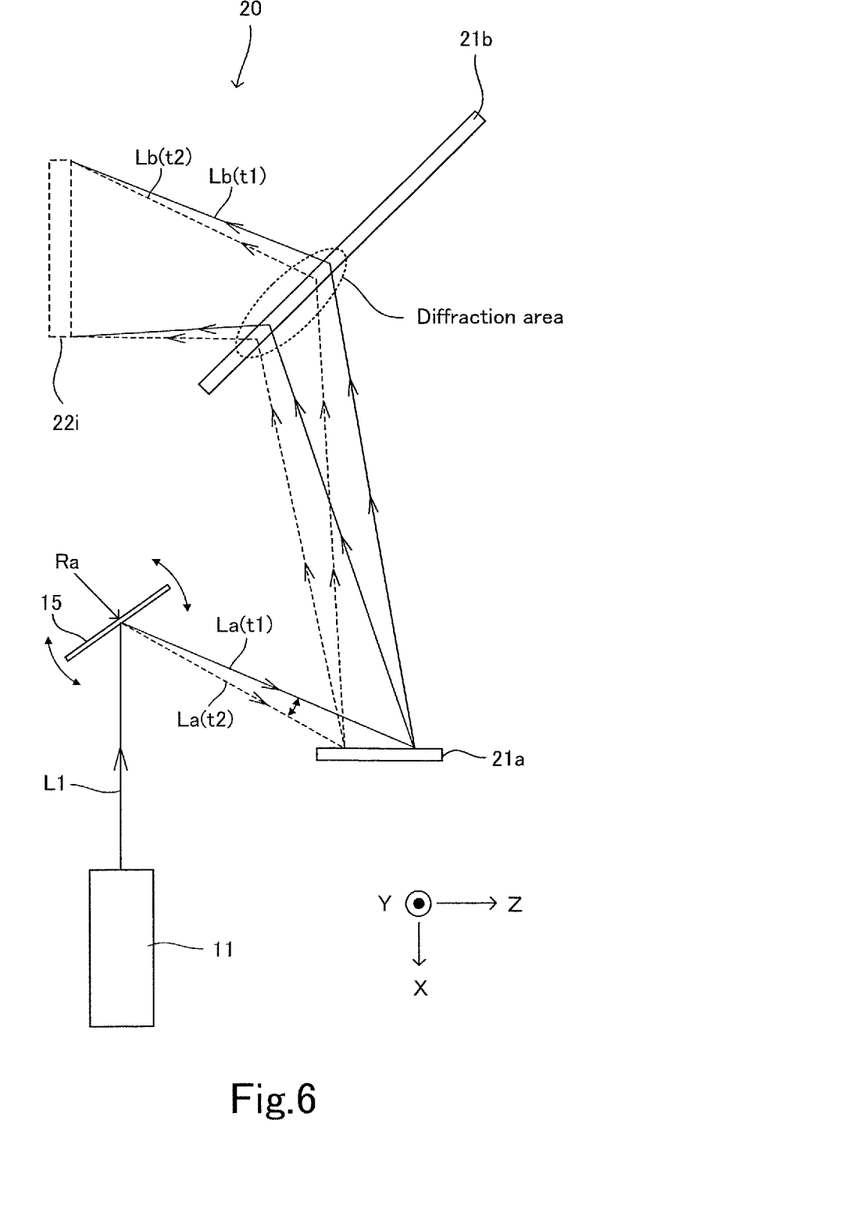
FIG. 6 is a view illustrating a configuration of the illumination section according to another embodiment of the present invention.

The hologram 21 may be divided in function and constructed as a plurality of holograms 21. FIG. 6 is a view illustrating a configuration of the illumination section according to still another embodiment of the present invention. In the present embodiment, the functions of the above-described hologram 21 are shared by first and second holograms 21a and 21b.

The first hologram 21a is a hologram on which the diffuser image 22i is recorded, as in the above-described embodiments. The second hologram 21b diffracts the scanning light such that the diffuser image 22i reproduced by the first hologram 21a illuminates the entire image formation area of the LCOS 31. In this case, a diffraction angle of the hologram 21a is restricted to an angle range within which the light entering the hologram 21b can be diffracted. When the reference light for the second hologram 21b and diffracted light from the hologram 21a have the same angular profile, the restriction need not be imposed on the diffraction angle of the first hologram 21a.

Also, in the present embodiment, the coherent light L1 emitted from the light source 11 forms the same diffuser image 22i regardless of a scanning position of the optical scanning section 15. As in the above-described embodiments, the diffuser image 22i is formed by light which incident angle is changed with time, thereby consequently averaging the speckle to make the speckle invisible.

The present invention is not limited to the above embodiments, and an embodiment obtained by appropriately combining technical features disclosed in each of the above embodiments is included in the technical scope of the present invention.

EXPLANATION OF REFERENCE SYMBOLS

10: Projection type image display device
11: Light source
11R, 11G, 11B: Unit color light source
12: Light collection optical system
15: Optical scanning section
20: Illumination section
21: Hologram
21a: First hologram
21b: Second hologram
211R, 211G, 211B: Liquid crystal hologram
22: Diffuser plate
22i: Diffuser image
23: Light collection optical system
24: Hologram recording material
31: LCOS (Liquid Crystal On Silicon)
32: Projection optical system
33: Controller
41: Screen

The invention claimed is:
1. A projection type image display device comprising:
a light source that emits coherent light;
an optical scanning section that scans the coherent light emitted from the light source;
an LCOS that has an image formation area in which an image is formed;
a projection optical system that projects an image formed on the image formation area on a screen; and a hologram that has polarization selectivity and diffuses scanning light scanned by the optical scanning section so as to allow diffusion light emitted from respective points thereof to illuminate the image formation area in an overlapping manner.

2. The projection type image display device according to claim 1, wherein
optical scanning section is a mirror device.

3. The projection type image display device according to claim 1, wherein
hologram having polarization selectivity has a liquid crystal hologram that can switch between a diffraction state and a transmission state with respect to polarized light oscillated in a specific direction in response to voltage application.

4. The projection type image display device according to claim 3, wherein
light source has unit color light sources that emit coherent lights of different wavelengths from each other,
hologram is formed by stacking a plurality of the liquid crystals, and
projection type image display device includes a controller that turns on, in series, the unit color light sources to put the liquid crystal hologram corresponding to the turned-on unit color light source into the diffraction state.

5. The projection type image display device according to claim 1, wherein
hologram having polarization selectivity includes a photorefractive material having refractive index anisotropy or a liquid crystal having refractive index anisotropy.

6. A projection type image display device comprising:
a light source that emits coherent light;
an optical scanning section that scans the coherent light emitted from the light source;
an LCOS that has an image formation area in which an image is formed;
a projection optical system that projects an image formed on the image formation area on a screen;
a first hologram that diffuses scanning light scanned by the light scanning section; and
a second hologram that has polarization selectivity and diffracts diffusion light from the first hologram, wherein
the diffusion lights emitted from respective points of the first hologram are diffracted by the second hologram so as to illuminate the image formation area in an overlapping manner.

* * * * *